(12) United States Patent
Bonnat (10) Patent No.: US 8,339,287 B2
(45) Date of Patent: Dec. 25, 2012

(54) DEVICE TO CONTROL AN ELECTRONIC OR COMPUTER SYSTEM UTILIZING A FLUID FLOW AND A METHOD OF MANUFACTURING THE SAME

(75) Inventor: Pierre Bonnat, Grieges (FR)

(73) Assignee: Inputive Corporation, Las Vegas, NV (US)

( * ) Notice: Subject to any disclaimer, the term of this patent is extended or adjusted under 35 U.S.C. 154(b) by 0 days.

(21) Appl. No.: 11/676,456

(22) Filed: Feb. 19, 2007

(65) Prior Publication Data

US 2011/0304424 A1 Dec. 15, 2011

Related U.S. Application Data

(63) Continuation of application No. 10/402,729, filed on Mar. 28, 2003, now Pat. No. 7,250,877.

(60) Provisional application No. 60/368,602, filed on Mar. 29, 2002, provisional application No. 60/378,573, filed on May 6, 2002, provisional application No. 60/402,994, filed on Aug. 12, 2002.

(51) Int. Cl.
    *H03M 11/00* (2006.01)
(52) U.S. Cl. ......... 341/21; 341/20; 340/825.19; 400/87; 200/52 R; 200/DIG. 2; 200/DIG. 30
(58) Field of Classification Search .............. 341/20–24; 340/4.1; 704/271
    See application file for complete search history.

(56) References Cited

U.S. PATENT DOCUMENTS

| | | | |
|---|---|---|---|
| 4,207,959 A | 6/1980 | Youdin et al. | |
| 4,301,449 A | 11/1981 | Fitzgerald | |
| 4,433,685 A | 2/1984 | Giorgini et al. | |
| 4,713,540 A | 12/1987 | Gilby et al. | |
| 4,746,913 A * | 5/1988 | Volta | 345/184 |
| 4,929,826 A | 5/1990 | Truchsess et al. | |
| 4,993,308 A * | 2/1991 | Villeneuve | 84/724 |
| 5,126,731 A * | 6/1992 | Cromer, Jr. | 340/4.11 |
| 5,341,133 A | 8/1994 | Savoy et al. | |
| 5,378,850 A | 1/1995 | Tumura | |
| 5,422,640 A | 6/1995 | Haley | |

(Continued)

OTHER PUBLICATIONS

"International Search Report", PCT/US03/09486, (Aug. 13, 2004).

*Primary Examiner* — Timothy Edwards, Jr.
(74) *Attorney, Agent, or Firm* — McAndrews, Held & Malloy, Ltd.

(57) ABSTRACT

A device to facilitate a user interface of a computer system utilizing breath includes a body, a user side inlet defined by the body to receive a fluid flow generated by a user, an exhaust opening defined by the body, a conduit positioned between the user side inlet and the one exhaust opening, at least one segment positioned inside the body and one or more contactors positioned to be intermittently in contact with the at least one segment. The contact may occur responsive to the fluid flow generated by the user. The device may include a sensor to react to a movement of the at least one segment.

27 Claims, 8 Drawing Sheets

U.S. PATENT DOCUMENTS

| | | | |
|---|---|---|---|
| 5,523,745 A * | 6/1996 | Fortune et al. | 340/4.12 |
| 5,603,065 A | 2/1997 | Baneth | |
| 5,763,792 A | 6/1998 | Kullik | |
| 5,889,511 A | 3/1999 | Ong et al. | |
| 5,907,318 A | 5/1999 | Medina | |
| 6,213,955 B1 | 4/2001 | Karakasoglu et al. | |
| 6,396,402 B1 | 5/2002 | Berger et al. | |
| 6,574,571 B1 | 6/2003 | Bonnat | |
| 6,801,231 B1 * | 10/2004 | Beltz | 715/865 |
| 7,584,064 B2 * | 9/2009 | Bonnat | 702/48 |
| 7,739,061 B2 * | 6/2010 | Bonnat | 702/48 |
| 2004/0164881 A1 * | 8/2004 | Loun Mok et al. | 341/20 |

* cited by examiner

DEVICE TO CONTROL AN ELECTRONIC OR COMPUTER SYSTEM UTILIZING A FLUID FLOW AND A METHOD OF MANUFACTURING THE SAME

CLAIM OF PRIORITY

The present application is a continuation of U.S. application Ser. No. 10/402,729 filed on Mar. 28, 2003 now U.S. Pat. No. 7,250,877 and claims the benefit of the filing dates of U.S. provisional patent application Ser. No. 60/368,602, filed Mar. 29, 2002, No. 60/378,573 filed May 6, 2002, No. 60/402,994 filed Aug. 12, 2002 and also incorporates these provisional applications by reference.

The present application also incorporates by reference International Application no. PCT/FR00/00362.

FIELD OF THE INVENTION

The present invention relates in general to controlling a computer system or an electronic system, and, in one exemplary embodiment, to a device to control an electronic or computer system by means of a fluid flow and a method of manufacturing the same.

SUMMARY OF THE INVENTION

In one exemplary embodiment, a device to facilitate a user interface of a computer system utilizing breath. The device includes a body, a user side inlet defined by the body to receive a fluid flow generated by a user, and an exhaust opening defined by the body. The fluid flow may be either inhaled into the device or expelled from the device through the exhaust opening. The device may include a conduit positioned between the user side inlet and the one exhaust opening. The conduit is to allow the fluid flow to travel between the at least one user side inlet and the at least one exhaust opening. The device may include at least one segment positioned inside the body. The segment is sensitive to the fluid flow generated by the user, which allows effectuating one of a first control action, and a second control action. The device may include one or more contactors. A first contactor of the one or more contactors is positioned such as it is intermittently in contact with the at least one segment. The contact may occur responsive to the fluid flow contact with the at least one segment. The contact may occur responsive to the fluid flow generated by the user. The device may include a sensor to react to a movement of the at least one segment.

Further in accordance with the exemplary embodiment of the present invention, a method of manufacturing a device to interact with a computer system by breathing is described. The method includes defining at least one user side inlet within a body to receive a fluid flow generated by a user. The method further includes defining at least one exhaust opening within the body through which the fluid flow is either inhaled into the device or expelled from the device defining at least one conduit between the at least one user side inlet and the at least one exhaust opening to allow the fluid flow to travel between the at least one user side inlet and the at least one exhaust opening. The method further includes locating at least one segment within the body, the at least one segment being sensitive to the fluid flow generated by the user to effectuate one of a first control action, and a second control action. According to one embodiment, the method further includes locating one or more contactors within the body. The locating one or more contactors within the body includes positioning a first contactor of the one or more contactors such as it is intermittently in contact with the at least one segment, the contact occurring responsive to the fluid flow generated by the user. The method further includes locating a sensor within the body to react to a movement of the at least one segment.

DETAILED DESCRIPTION

A device to facilitate a user interface of a computer system utilizing breath is described. In the following description, for purposes of explanation, numerous specific details are set forth in order to provide a thorough understanding of the present invention. It will be evident, however, to one skilled in the art that the present invention may be practiced without these specific details.

In one embodiment, the invention is a relative input device (e.g., it reports its distance and direction of movement each time it is moved, but cannot report its absolute position). The invention may provide improved performance and accuracy, in accordance with the Fitts' Law, compared to alternative devices. It will be appreciated that other embodiments of the invention could be integrated in an absolute input system by adding to the basic device any of the usual magnetic or ultrasonic trackers.

Some of the applications of the present invention may relate to the fields of ubiquitous, wearable computing, electronic games, automotive and avionics ergonomic control by a driver or pilot, physiological monitoring, home automation, etc, as most of these domains of applications require "on/off" functions in addition to variable ones.

Figure 1:
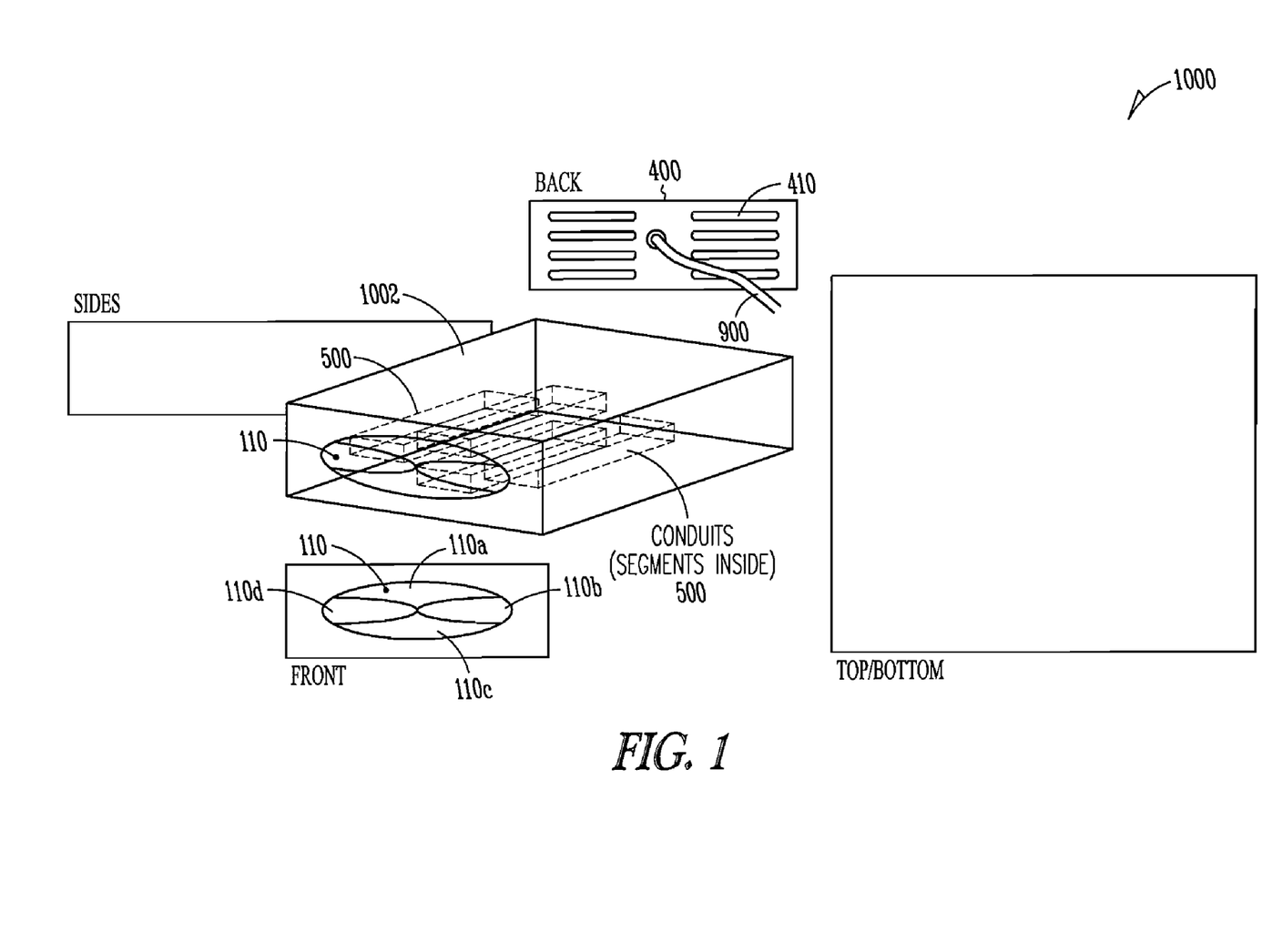
FIG. 1 provides general views of a device according to an exemplary embodiment of the present invention.

FIG. 1 provides front, back, side, top, and a perspective view of a device to interact with a computer system in the exemplary form of a sensor module 1000.

Sensor module 1000 includes a body 1002 in which are defined a plurality of conduits 500, illustrated in broken line. The conduits 500 may be rectangular in profile, and extend from inlet chambers 110 defined within a front face of the block 1002 to a plurality of exhaust outlets 410 defined in a back face of the body 1002.

In the exemplary embodiment illustrated in FIG. 1, four conduits 500 are shown to be defined within the body 1002, with two of the conduits being located in vertical alignment and 2 of the conduits being located in horizontal alignment. In other embodiments, the number of conduits 500, and also the numbers of inlets 110 and exhaust outlets 410 may vary.

Figure 2A:
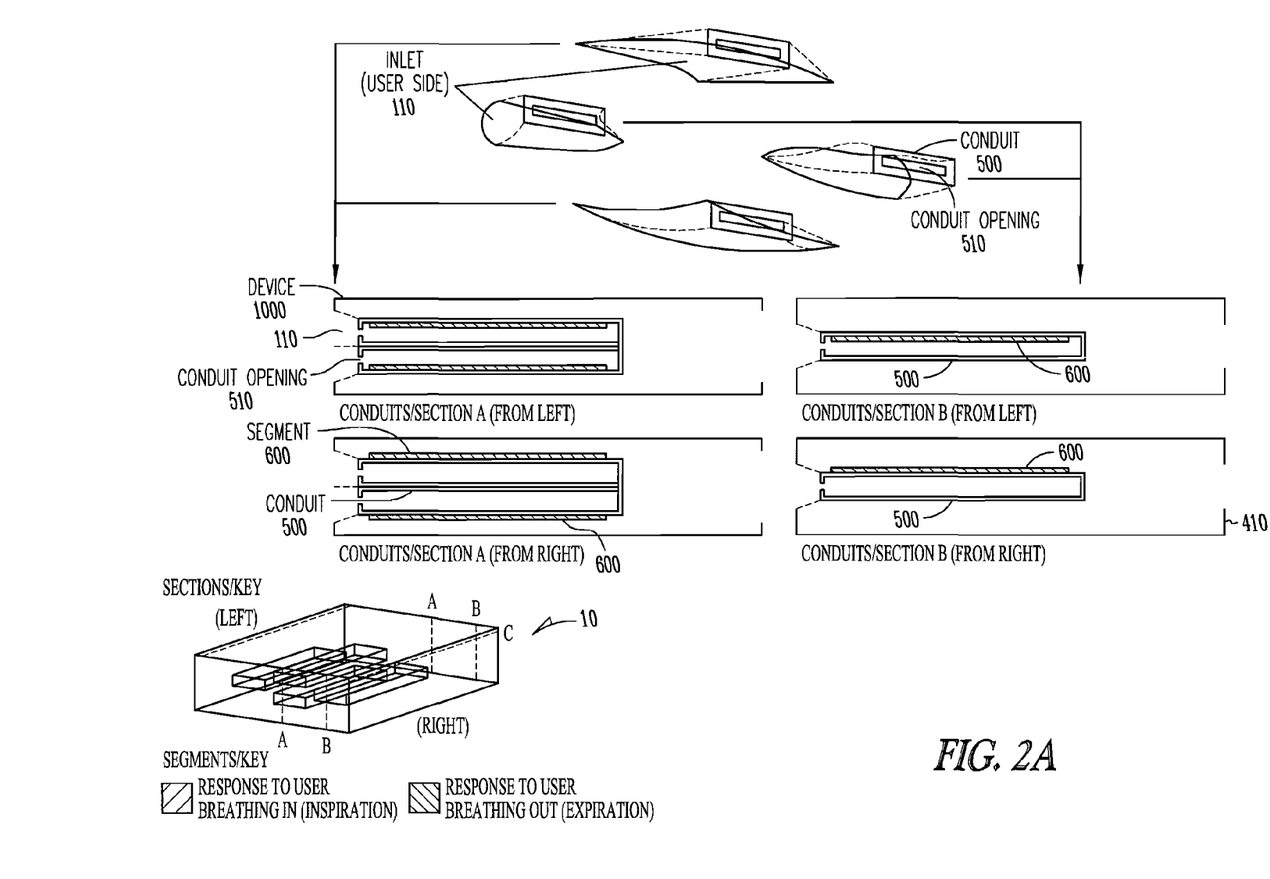
FIGS. 2A and 2B provide detailed access to inside of the exemplary device.
Figure 2B:
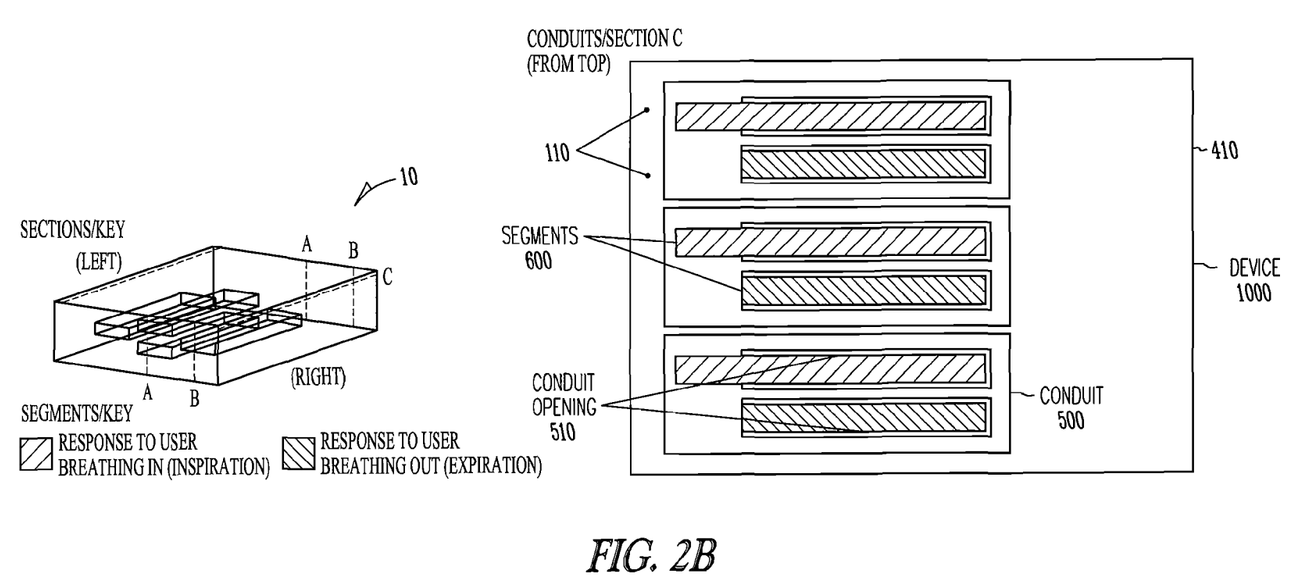

A flexible member or segment 600 (shown in FIG. 2) is coupled to each of the conduits 500 so as to be sensitive to a fluid flow, in the exemplary embodiment of an air flow, through the relevant conduit 500. In the exemplary embodiment, each segment 600 has a fixed end and a free end so as to facilitate increasing movement of the segment 600 responsive to an air flow towards the free end.

The inlets 110 are profiled so as to direct an air flow (e.g. breath expelled by a user into an associated conduit 500). FIG. 2A provides further detail regarding exemplary profiles for inlets 110.

At a high level, the sensor module 1000 operates to generate one or more control signals that are communicated, for example, by a cord 900 to a machine (e.g., a computer) thereby facilitate interaction by a user of the sensor module 1000 with the relevant machine. More specifically, the segments 600 coupled to each of the conduits 500 is sensitive to an air flow through the associated conduit and serves to translate certain characteristics of that air flow into a signal that may be, for example, communicated to a machine for the purposes of interacting with that machine.

According to an exemplary embodiment of the present invention, the manufacturing process of a sensor module 1000 has the following operations:

(a) defining at least one user side inlet within a body to receive a fluid flow generated by a user;

(b) defining at least one exhaust opening within the body through which the fluid flow is either inhaled into the device or expelled from the device;

(c) defining at least one conduit between the at least one user side inlet and the at least one exhaust opening to allow the fluid flow to travel between the at least one user side inlet and the at least one exhaust opening;

(d) locating at least one segment within the body, the at least one segment being sensitive to the fluid flow generated by the user to effectuate one of a first control action, and a second control action;

(e) locating one or more contactors within the body, including positioning a first contactor of the one or more contactors such as it is intermittently in contact with the at least one segment, the contact occurring responsive to the fluid flow generated by the user; and (f) locating a sensor within the body to react to a movement of the at least one segment.

FIGS. 2A and 2B detail the inside of the exemplary sensor module 1000 according to one embodiment of the present invention. FIGS. 2A and 2B also show a three-dimensional view 10 of the exemplary sensor module 1000.

When the user breathes out (expiration), towards the sensor module 1000, the air is channeled by the user side inlets 110 to an openings 510 of an adjoining conduit 500, then through the conduit 500, stressing (e.g., bending or moving) a segment 600 positioned inside the conduit 500 to create an opening between the segment 600 and the interior of the sensor module 1000, and finally out the sensor module 1000 through the exhaust openings 410.

When the user breathes in (inspiration), sucking the air out of the sensor module 1000, air is channeled through at least one exhaust openings 410, through an opening between a stressed segment 600 and the walls of a conduit 500, then through the conduits 500, stressing the segments 600 positioned outside the conduit 500, and out of the sensor module 1000 through the user side inlet 110.

The user may breathe in and out of the user side inlet 110, thereby generating a air flow. No direct contact is required, since the segments 600 are to be constructed from light and flexible material, and are designed such as to be allowed to move very freely responsive to the air flow. The air flow may travel either towards or away from the user side inlets 110 and can stress (e.g., bend or move) the segments 600 through the conduits openings 510 of the conduits 500. The segments 600 are able to respond to the inward or outward direction of the air flow. In one embodiment, the segments 600 respond to the inward or outward direction of the air flow, depending on their position with respect to the conduits 500.

Air may flow in either direction through the exhaust openings 410. In one embodiment, the general design of the exhaust openings 410 helps avoid unwanted responses by minimizing external wind effects.

In one embodiment, the segments 600 are positioned with respect to the conduits 500 in such a way as to make the segments 600 responsive to the air flow. The segments 600 may be made of any material able to respond to the air flow produced by human breath (stress breath) by bending, in proportion to the breath intensity, rather than substantially vibrating, and returning to its rest position when the stress breath stops. The segment 600 deflects inside a curved channel designed to maintain the pressure through the travel of the segment 600. The exhaust through the exhaust opening 410 is available at the end of the segment 600 travel. The thickness of the segment 600 may be between approximately 0.99 mm and approximately 0.11 mm. In some embodiments that utilize optical sensing, the segment 600 may include materials capable of blocking light (e.g., IR, ambient). In some embodiments that utilize magnetic-based sensors, the sensors may include ferromagnetic or ferric materials to comply with mechanical prerequisites.

In further embodiments, any mechanical or electromechanical device may generate the air flow. In one embodiment, a stop, or a lug can be positioned on a conduit 500 in order to dampen and stop the segment 600 back to its rest position, once the air flow stops. Materials that can be used for the segments 600 may be synthetic ones, injected or molded, ferromagnetic, piezo-electric or optical materials. In one embodiment, these materials may be used for conversion purposes and dampening/stopping as well as returning the segments 600 to the rest position.

In one embodiment, a segment 600 may be sensitive to both directions of the air flow. Furthermore, the segment 600 may be positioned flush with the conduits 500. The segment 600 can be positioned at any angle regarding the air flow channeling.

The air flow inside the conduits 500 may be detected by the use of segments 600. The sensing may be based on identifying vibration of the segment 600 or bending of the segment 600 responsive to the air flow. To effectuate sensing of the air flow, the distance between the sensor module 1000 (a sensing module) and a user may be between approximately 1.25 inches and approximately 1.75 inches. The air pressure at the user mouth resulting from the user's inhaling or exhaling into the sensor module 1000 may be approximately 0.15 PSI. The air pressure at the user side inlet 110 resulting from the user's inhaling or exhaling into the sensor module 1000 may be from approximately 0.003 PSI to approximately 0.004 PSI. The area of the user side inlet 110 may be approximately 100 square millimeters per segment. Increasing the area of the user side inlet 110 may increase the effect of the pressure. The distance to direct the flow, change direction is approximately 3 mm.

In one embodiment, the air flow generated by the user causes the segment 600 to vibrate. The exhaust opening 410 allows the air to be expelled from the sensor module 1000 as soon as the segment 600 deflects, and increases progressively with variations in pressure.

The thickness of the segment 600 may be between approximately 0.99 mm and approximately 0.11 mm. The modulus of elasticity maybe between approximately 7152 PSI and approximately 7352 PSI. The density of the segment 600 may be between approximately 390 kg/cubic meter and approximately 410 kg/cubic meter. In one embodiment, the maximum displacement of the segment 600 is approximately 5 mm. The exhaust available after a displacement of 4 mm. In some embodiments that utilize optical sensing, the segment 600 may include materials capable of blocking light (e.g., IR, ambient). In some embodiments that utilize magnetic-based sensors, the sensors may include ferromagnetic or ferric materials to comply with mechanical prerequisites.

In one embodiment, a segment 600 may be secured within the sensor module 1000 by fastening means (e.g. screw, glue, rivet) such as the air flow traveling through a conduit 500 causes the segment 600 to stress (e.g., bend or move). The segments 600 may also be embedded in the conduits 500 or integrated as part of the conduits 500. In one embodiment of the present invention, the segments 600 are flush with a plane of a conduit 500, either inside or outside of the conduit walls, depending on whether they are to respond, respectively, to the expiration (breathing out) or inspiration (breathing in) of the user, and the openings through which the segments can bend are made in the conduits 500 in order to provide an optimal air tightness.

The conduit openings 510 can bear, on their sides opposite to the segments 600, a non-return valve (not shown), allowing air flow to pass only in the stress direction of the corresponding segment, thus improving air tightness.

Figure 3:
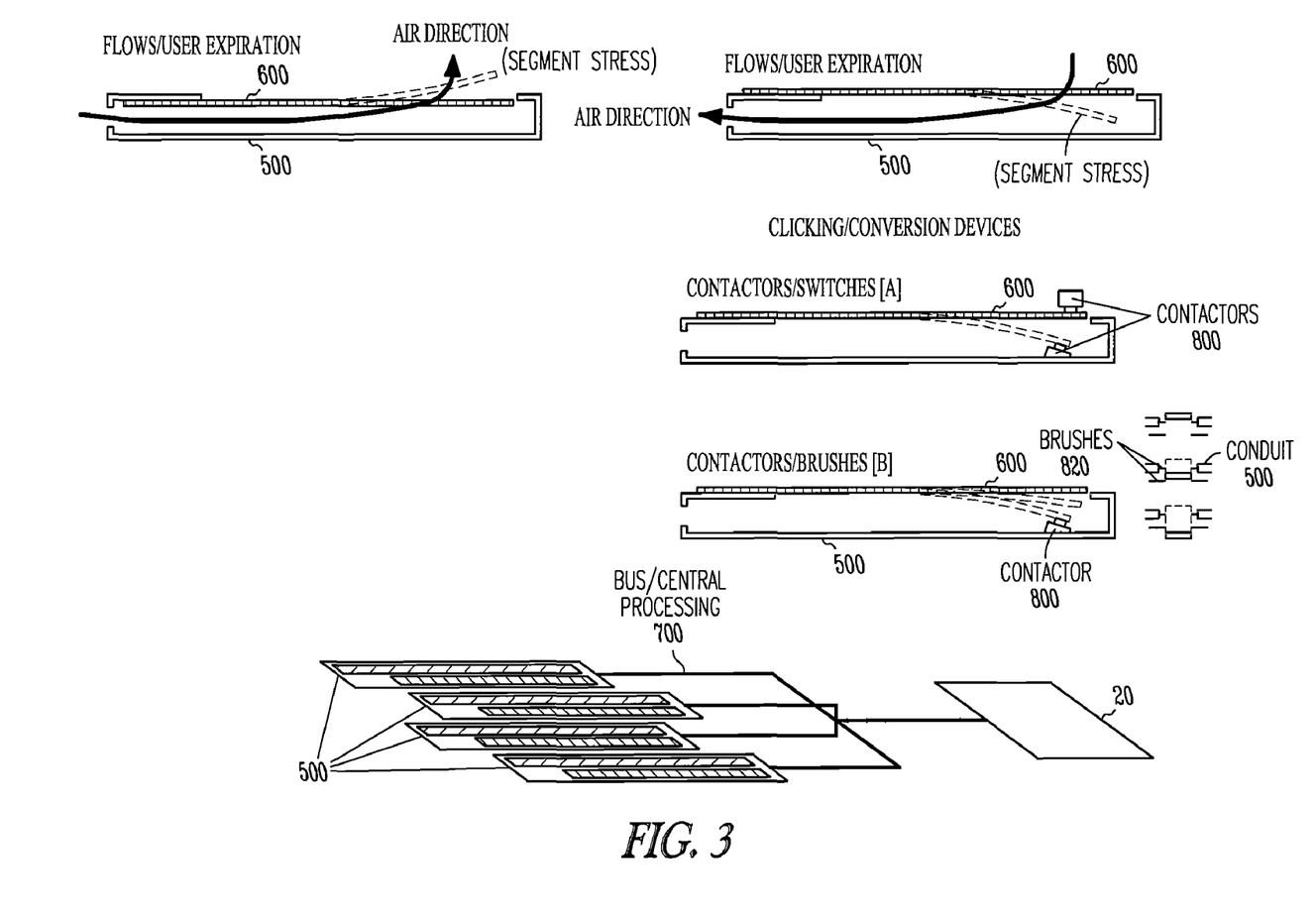
FIG. 3 shows two directions of the flow and clicking conversion devices.

FIG. 3 shows the air flow's two possible directions. Again, in respective exemplary embodiments of the invention, multiple directions may be utilized in accordance with the present invention. With respect to the conversion of stress on the segments 600, the distinction may be made between pointing and clicking operations.

As to pointing, the exemplary embodiment of the present invention may incorporate the features disclosed in PCT/FR00/00362.

With respect to clicking, in one embodiment of the invention, the segments 600 are used for "all or nothing" purposes, based on contact. Two of many possible embodiments of the invention are depicted: the first one, [a], uses contactors 800 and/or switches, the second one, [b], uses contactors 800 and brushes 820. In embodiment [a], the system is based on two contactors 800. One contactor is positioned outside the conduit 500 and in sustained contact with the segment 600 in its rest position. The other contactor is positioned inside the conduit 500, approximately at full stroke of the segment 600. In the depicted embodiment, a sustained contact generates no signal, a short loss of contact (quick inspiration) generates a single click; a loss of contact with sufficient stroke to make the segment contact the other contactor (inside the conduit), and then come back to its rest position, generates a double click. A loss of contact and a long contact with the inside contactor generates a held click, which lasts until a single click (or another held click) is generated by the user. While the held click is being in effect, the user may effectuate a motion (e.g., drag and drop). This feature may be used in combination with the teachings of International Application PCT/FR00/00362. In this embodiment, a first segment 600 may be sensitive to a first air flow direction to effectuate clicking operation, and a second segment 600 may be sensitive to a second air flow direction to effectuate pointing operation. In embodiment [b], the powered brushes 820 are used in addition to the inside contactor 800. The segment 600 is made, at least partly (in the brushes zone), of a conductive material (e.g., ferromagnetic). The brushes 820 are positioned in pairs, inside the conduit 500, on both sides of the segment 600. The segment 600 contacts the first pair of brushes (with a negligible frictional resistance) when stressed by a gentle, moderate stress breath of the user. The second pair of brushes may be contacted by the segment 600 by applying a stronger though still moderate inspiration. Each contact with a pair of brushes conducts the electric current from one brush of the pair to the other brush of the pair, thus generating a "click" signal. Thus, a light expiration by the user generates a single click, and a moderate expiration generates a double click. The processing system does not take into account the electric loops generated by the segment's return, possibly because of a time delay relay or equivalent means. The held click in embodiment [b] is effectuated the same way as in embodiment [a].

Some significant variants can be envisaged, as to the clicking functions. For instance, switches can replace contactors. The switches may be pressure sensitive. A number of materials or combinations of materials may be used in order make the segments 600 more responsive to the user's actions (e.g., ferromagnetic material in the segment and mini magnets integral with the contactors). The contactors 800, switches and/or brushes 820 can produce "click-like" sounds to maintain the usual mouse sounds. A variety of other embodiments are possible in order to enhance the invention, according to the technical solutions adopted in the present invention. A variety of available voltages, interfacing requirements, and user customization needs may be utilized, like piezo-electricity for segment dampening and response to stress purposes, electromagnetic contactors in case of ferromagnetic segments, and a number of optional parameters the user could set, such as delays and/or signals' thresholds differentiation between single click, double click, held click, etc.

With regard to held clicking, the user must be able to pursue any pointing function and to generate a new motion while performing the held clicking (e.g., dragging and dropping, resizing). Therefore, in one embodiment of the present invention, the processing means may include a bus 700 that links together all the contactors and/or switches dedicated to the "held click" function, thus providing a single, uninterrupted and central processing of the data resulting from the various electric signals generated. The bus 700 may be connected to the processing device 20. Similarly, a processor to process the signal emitted by the converter provides a continuous and progressive movement of the pointer (direction, pace and distance), and a satisfactory monitoring of the single and double click functions, with no unwanted repetition, when the user's stress breath moved from one/multiple segment(s) to one/multiple other ones. Network circuits, signal comparison, delay and threshold management, etc. may accomplish this, for instance.

While FIG. 1 illustrates the body of the sensor module 1000 defining four conduits 500, in an alternate exemplary embodiment the body may define five conduits 500, each including a segment 600 to be stressed by the air flow generated by user breathing. One of the conduits 500 may be dedicated to Boolean sensing, responding to the presence of the air flow, rather than to the air flow in one particular direction, and with variable intensity.

Figure 4:
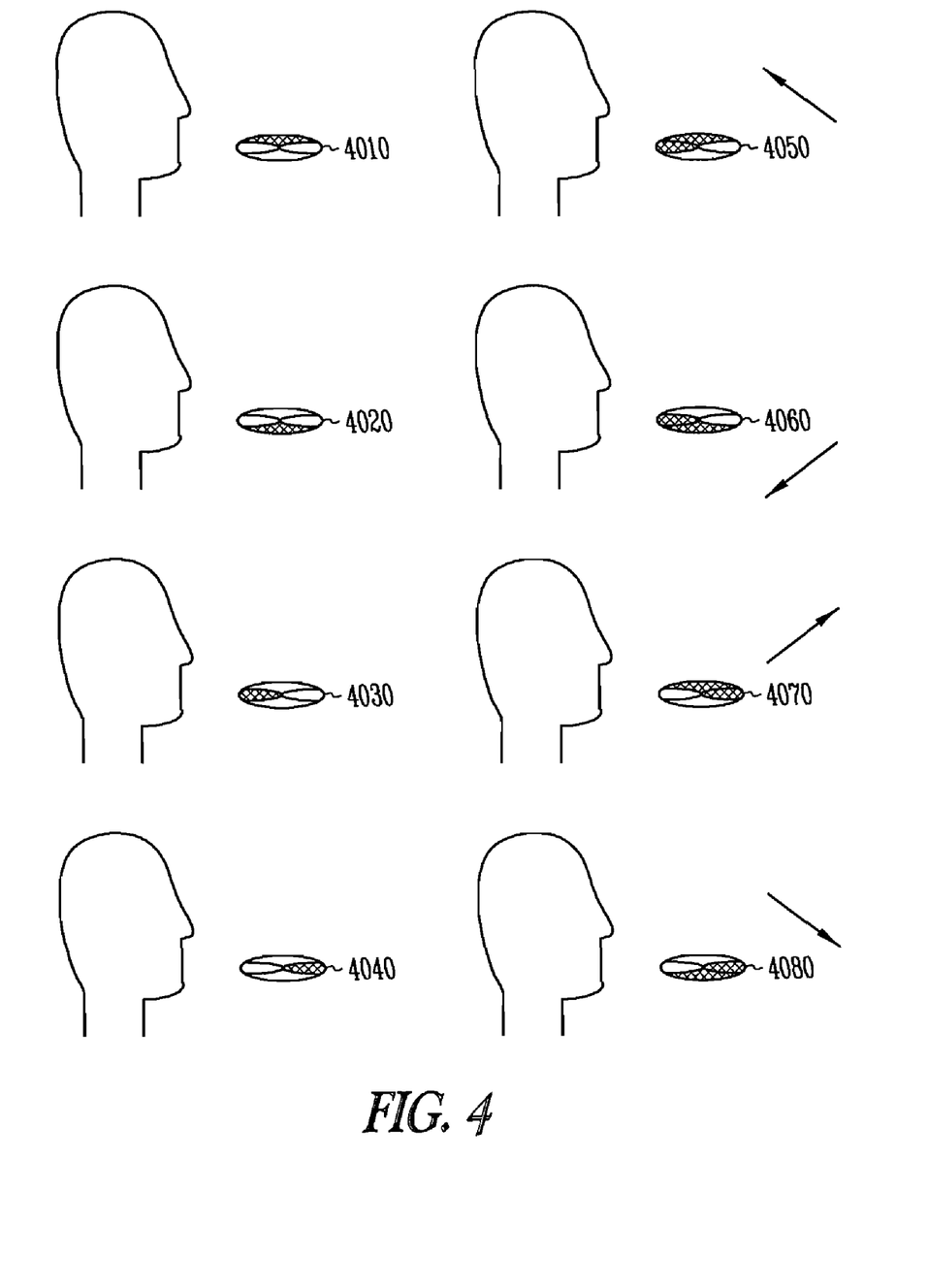
FIG. 4 is a diagrammatic representation of phases of the user's stress breath.

FIG. 4 shows exemplary possibilities for the user's stress breath (e.g., expiration/breathing out) through the various inlets of the sensor module 1000 resulting in various pointer movements. In state 4010, the user is breathing through the top inlet, effectuating a pointer movement in the vertical direction upwards. In state 4020, the user is breathing through the bottom inlet, effectuating a pointer movement in the vertical direction downwards. In state 4030, the user is breathing through the left side inlet, effectuating a pointer movement in the horizontal direction left. In state 4040, the user is breathing through the right side inlet, effectuating a pointer movement in the horizontal direction right. The diagonal movement is illustrated at states 4050-4080. The diagonal movement is illustrated at forty-five degrees angles, however, the progressiveness of the monitoring and processing software is constant on three hundred and sixty degrees, and thus the pointer may be moved at any degree.

Figure 5:
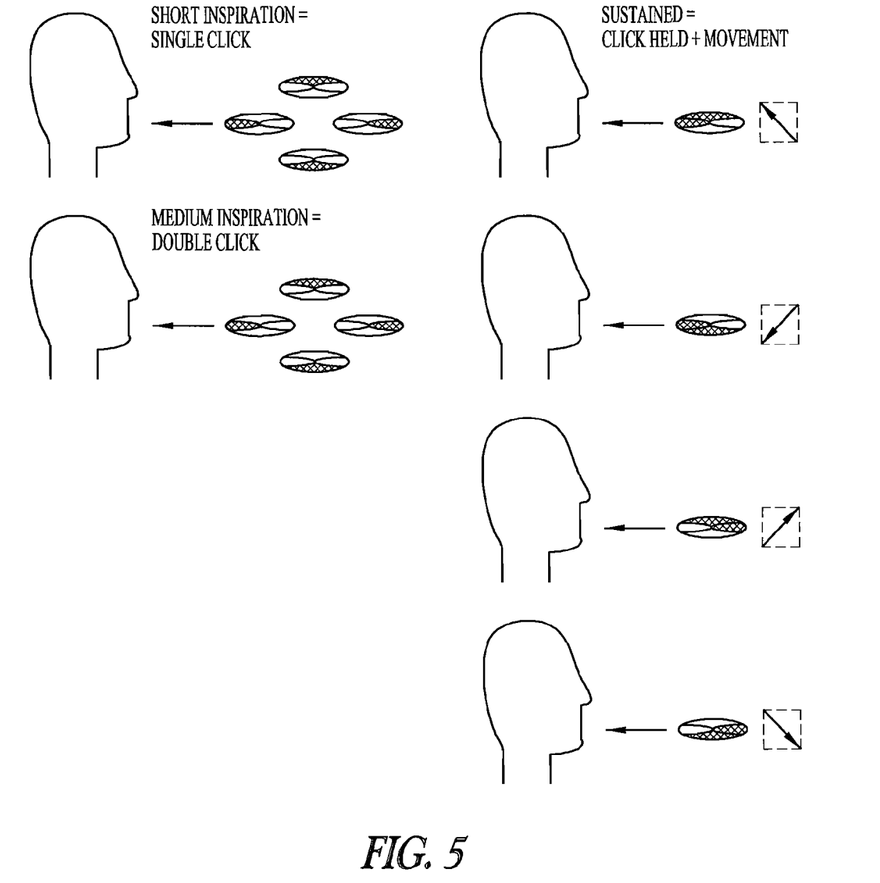
FIG. 5 is a diagrammatic representation of the three possible ways of performing clicking.

FIG. 5 details three exemplary ways of clicking. A short inspiration by the user effectuates a single click. A medium inspiration by the user effectuates a double click. In relation to the "click held" function, the progressiveness of the monitoring is constant on three hundred and sixty degrees.

Figure 6A:
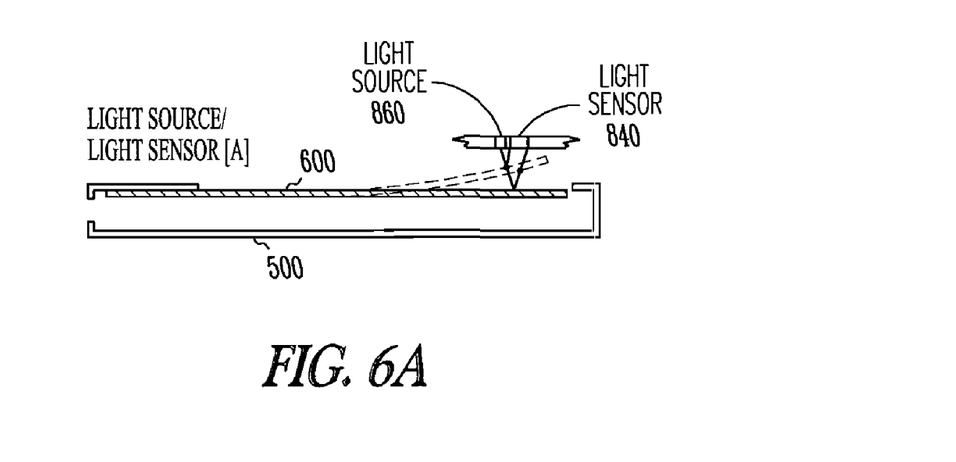
FIGS. 6A and 6B are side view of an exemplary device, illustrating conversion devices utilizing light sensors.

In FIG. 6A, the light source 860 and the light sensor 840 are positioned in such a way that the segment 600 reflects the light from the source 860 to the sensor 840. In addition, in this example, the light is emitted from the source 860 in a discontinuous, intermittent way, with a constant or variable frequency, and the sensor 840 is based on the time elapsed between the light emission and its reception. The variation of time is thus converted into a variable electric signal, which may be processed as a pointing, scrolling, zooming, or panning function.

Figure 6B:
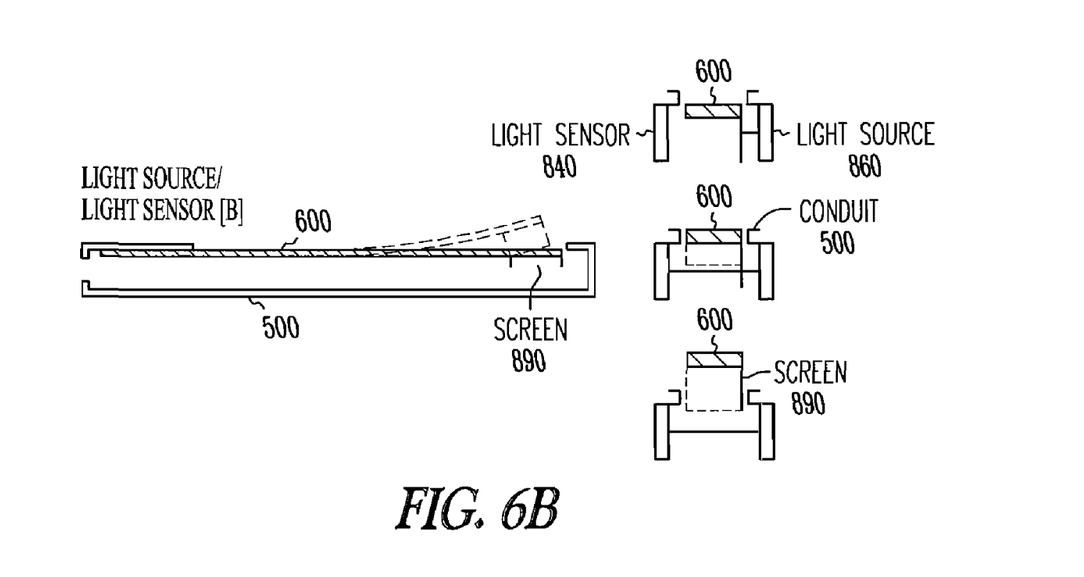

In FIG. 6B, the segment 600 bears a screen 890 on its free extremity. The light source 860 and a sensor 840 are positioned opposite each other, inside the conduit 500, on both sides of it and of the segment 600. The segment 600 bears on its free extremity a screen 890, which is opaque near the segment 600, then less and less opaque, down to its other edge. This results in a variable, progressive illumination of the sensor 840 (a priori in a linear way, although able to vary according to the screen opacity's progressiveness), from dark to full light, converted into a variable electric signal.

Figure 7A:
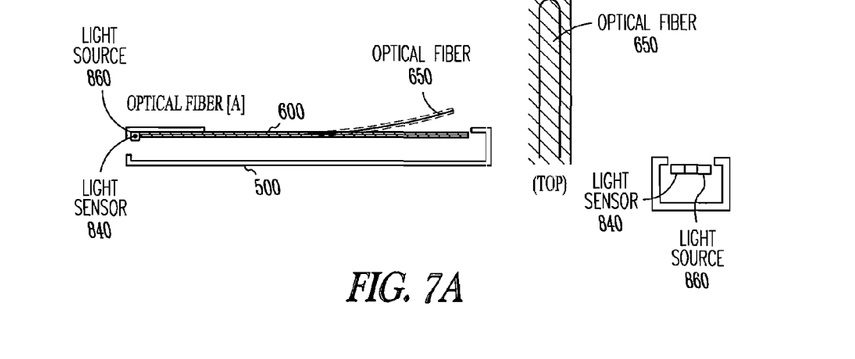
FIGS. 7A and 7B: show conversion devices utilizing light sensors to process pointing and clicking.

In FIG. 7A, an optical fiber 650 is integral with the segment 600. Responsive to the bending of the segment 600, the changes in the light attenuation affect the sensor 840. In one exemplary embodiment, the fiber is "looped" back on itself. In another exemplary embodiment, the appropriate reflector is used to focus the beam on the light receiver.

Figure 7B:
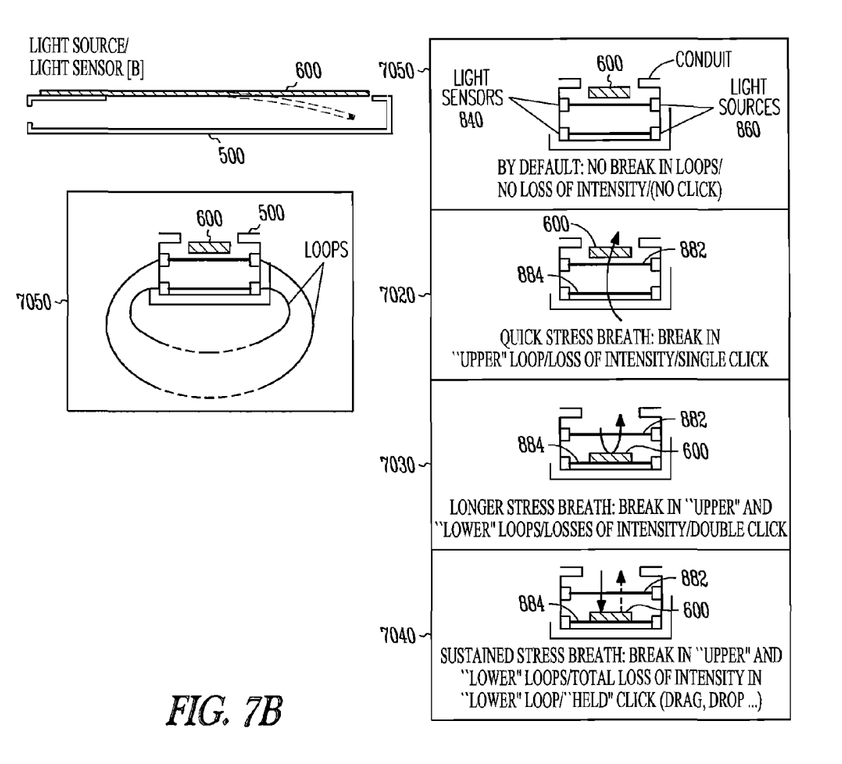

FIG. 7B illustrates a fully optical way of implementing the clicking functionality. According to an exemplary embodiment of the present invention, light loops 880 are intact in the absence of the air flow, illustrated by state 7050. In the state 7020, a quick stress breath causes a break in the upper loop 882, resulting in a single click. In the state 7030, a moderate stress breath causes a break in the upper loop 882 and in the lower loop 884, resulting in a double click. In the state 7040, a long stress breath causes a complete loss of intensity in the lower loop 884, resulting in a held click to accommodate a "drag-and-drop" operation.

While the above-disclosed embodiments relate to functions that are ordinarily performed with the use of a mouse in a GUI environment, the present invention's principle is not restricted to a two-dimensional environment. The present invention is applicable to the three-dimensional pointing and tracking or more (e.g., by repeating the describes principle in several planes, several combinations between pointing and clicking devices), to scrolling (or even auto scroll) and zooming functions as well, to customizable solutions, and can be used in a variety of fields, like games, ergonomic controls, etc. In one embodiment the sensor module 1000 provides the user with the two ways of controlling a computer or an electronic system (on/off control and continuous change of status control) through a single organ (e.g., a mouth or nose), and a single action, thus not interfering with other organs (e.g., hands or eyes), which could be used for other input or output purposes. There should be noted that this device may have various shapes (e.g., in order to prevent wind or other external interferences) and may be embedded or integrated in a variety of portable, wearable devices, e.g., a headset.

The invention can work with standard GUIs' drivers, though special drivers can be designed to match the product features, improve accuracy and take advantage of extra functionalities. The invention may also receive input from the dialog boxes presented by many computer programs to specify settings (e.g., interaction range, meaning, control-display ratio, appearance etc.) relating to the relevant program or to the computer system.

The computer system may include a processor, a main memory and a static memory, which communicate with each other via a bus. The computer system may further include a video display unit (e.g., a liquid crystal display (LCD) or a cathode ray tube (CRT)). The computer system may also include an alphanumeric input device (e.g., a keyboard), a cursor control device (e.g., a mouse), a disk drive unit, a signal generation device (e.g., a speaker) and a network interface device. In alternative embodiments, the computer system may also comprise personal computer (PC), workstation, a set-top box (STB), Personal Digital Assistant (PDA), a cellular telephone, a web appliance or any machine capable of executing a sequence of instructions that specify actions to be taken by that machine.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A device to facilitate a user interaction with a computer system utilizing breath, the device including:
a body;
at least one user side inlet defined by the body to receive a fluid flow generated by a user;
at least one exhaust opening defined by the body through which the fluid flow is either inhaled into the device or expelled from the device;
at least one conduit positioned between the at least one user side inlet and the at least one exhaust opening to allow the fluid flow to travel between the at least one user side inlet and the at least one exhaust opening;
at least one segment positioned inside the body, the at least one segment having a bendable portion and being sensitive to the fluid flow generated by the user to effectuate one of a first control action and a second control action;
one or more contactors, wherein a first contactor of the one or more contactors is positioned such as it is intermittently in contact with the at least one segment, the contact occurring responsive to the fluid flow generated by the user; and
a sensor to react to a movement of the at least one segment.

2. The device of claim 1, wherein the at least one segment includes flexible material such as to allow the at least one segment to move freely responsive to the fluid flow generated by the breath of the user.

3. The device of claim 1, including a second contactor of the one or more contactors positioned in sustained contact with the at least one segment in the absence of the fluid flow generated by the user.

4. The device of claim 1, wherein the one or more contactors include: a first pair of powered brushes positioned inside the at least one conduit on both sides of the at least one segment capable of intermittent contact with the at least one segment responsive to a light fluid flow generated by the user; and a second pair of powered brushes positioned inside the at least one conduit on both sides of the at least one segment capable of intermittent contact with the at least one segment responsive to a moderate fluid flow generated by the user.

5. The device of claim 1, wherein: the first of the one or more contactors include a pressure sensitive switch, the pressure sensitive switch including one of a magnet, and a ferromagnetic material; and the at least one segment include one of a magnet, and a ferromagnetic material.

6. The device of claim 1 wherein the at least one contactor is capable of producing a sound.

7. The device of claim 1 including a bus to link together the one or more contactors.

8. The device of claim 1 including a lug to dampen bending of the at least one segment responsive to cessation of the fluid flow generated by the user.

9. The device of claim 8, wherein the lug includes a spring.

10. The device of claim 1, wherein the sensor includes an analogue bus to provide analogue sensing.

11. The device of claim 1, wherein the at least one segment is positioned flush with the at least one conduit.

12. The device of claim 1, including one or more trackers to allow the device to react to an absolute input.

13. The device of claim 1, wherein the fluid flow is generated by one of a human breathing, a mechanical device, and an electromechanical device.

14. The device of claim 2, wherein the flexible material includes one of a synthetic material, a ferromagnetic material, a piezo-electric material, and an optical material.

15. The device of claim 1, wherein the sensor includes a light source, and a light sensor.

16. A method of manufacturing a device to interact with a computer system by breathing, the method including:
   defining at least one user side inlet within a body to receive a fluid flow generated by a user;
   defining at least one exhaust opening within the body through which the fluid flow is either inhaled into the device or expelled from the device;
   defining at least one conduit between the at least one user side inlet and the at least one exhaust opening to allow the fluid flow to travel between the at least one user side inlet and the at least one exhaust opening;
   locating at least one segment within the body, the at least one segment having a bendable portion and being sensitive to the fluid flow generated by the user to effectuate one of a first control action, and a second control action;
   locating one or more contactors within the body, including positioning a first contactor of the one or more contactors such as it is intermittently in contact with the at least one segment, the contact occurring responsive to the fluid flow generated by the user; and
   locating a sensor within the body to react to a movement of the at least one segment.

17. The method of claim 16, wherein the at least one segment includes light and flexible material such as to allow the at least one segment to move freely responsive to the fluid flow generated by the breath of the user.

18. The method of claim 17 including positioning a second contactor of the one or more contactors in sustained contact with the at least one segment in the absence of the fluid flow generated by the user.

19. The method of claim 17, wherein locating one or more contactors include: positioning a first pair of powered brushes inside the at least one conduit on both sides of the at least one segment capable of intermittent contact with the at least one segment responsive to a light fluid flow generated by the user, and positioning a second pair of powered brushes inside the at least one conduit on both sides of the at least one segment capable of intermittent contact with the at least one segment responsive to a moderate fluid flow generated by the user.

20. The method of claim 17, wherein: positioning a first contactor of the one or more contactors includes defining a pressure sensitive switch, the pressure sensitive switch including one of a magnet, and a ferromagnetic material, and the at least one segment of the one or more segments includes one of a magnet, and a ferromagnetic material.

21. The method of claim 16 including defining a bus to link together the one or more contactors.

22. The method of claim 18 including defining one of a lug, and a spring to dampen bending of the at least one segment.

23. The method of claim 16, wherein defining the sensor includes defining an analogue bus to provide analogue sensing.

24. The method of claim 16, including positioning the at least one segment flush with the at least one conduit.

25. The method of claim 16, including defining one or more trackers to allow the device to react to an absolute input.

26. The method of claim 17, wherein the flexible material includes one of a synthetic material, a ferromagnetic material, a piezo-electric material, and an optical material.

27. The method of claim 16, wherein defining the sensor includes installing a light source, and a light sensor.

* * * * *